United States Patent Office 3,642,690
Patented Feb. 15, 1972

3,642,690
STABILIZED ALPHA-MONOOLEFINS
Kenneth R. Mills, Bartlesville, Okla., assignor to
Phillips Petroleum Company
No Drawing. Filed Feb. 11, 1970, Ser. No. 10,597
Int. Cl. C08f 45/60
U.S. Cl. 260—45.75 N          9 Claims

ABSTRACT OF THE DISCLOSURE

Stabilized polymers from alpha-monoolefins are provided by employing a stabilizer composition containing 2-hydroxybenzophenone, or derivatives thereof, as an ultraviolet stabilizer, at least one antioxidant and nickel phosphate.

This invention relates to a process for improving the thermal and ultraviolet stability of polymer prepared from alpha-monolefins. This invention relates to a stabilized polymer composition. This invention relates to a stabilizer combination for improving the thermal and ultraviolet stability of polymers prepared from alpha-monoolefins. This invention further relates to a process for employing nickel phosphate in combination with 2-hydroxybenzophenone, and derivatives thereof, and at least one antioxidant to provide a thermal and ultraviolet stabilized polymer prepared from alpha-monoolefins.

Antioxidants for the inhibition of thermal oxidation of polymers prepared from alpha-monolefins are well known. In some cases, mixtures of hindered phenols and esters such as dilaurylthiodipropionate, or phenols and organic phosphites, or combinations of all three have provided improved or synergistic results. Ultraviolet absorbers have likewise been used with polymers prepared from alpha-monoolefins to decrease the absorption by the polymers of UV light which commonly leads to irreversible and damaging changes in the polymer. 2-hydroxybenzophenone, and derivatives thereof, have been found effective to varying degrees.

It has now been discovered that if nickel phosphate is employed in combination with an ultraviolet absorber selected from 2-hydroxybenzophenone, or derivatives thereof, and a conventional antioxidant of the type previously mentioned that the thermal and ultraviolet stability of a polymer prepared from alpha-monoolefins is greatly increased by the presence of the nickel phosphate. This is particularly surprising for nickel phosphate alone, or in combination with an antioxidant, in the absence of said 2-hydroxybenzophenone or derivatives thereof, actually decreases the thermal and UV stability of a polymer prepared from alpha-monoolefins.

According to my invention, nickel phosphate is employed with 2-hydroxybenzophenone or derivatives thereof, in combination with conventional antioxidants to improve the ability of said 2-hydroxybenzophenone, or derivatives thereof, to function as ultraviolet absorbers. The ultraviolet and thermal stabilizer combination of this invention thus comprises nickel phosphate, 2-hydroxybenzophenone, or derivatives thereof, and a conventional antioxidant. This stabilizing composition is an effective light and thermal stabilizer when used with alpha-monoolefin polymers containing from about 2-6 carbon atoms and especially for propylene polymers including both homopolymers and copolymers.

The ability of nickel phosphate to effectively supplement the stabilizing effect attributed by the 2-hydroxybenzophenone, or derivatives thereof, is not entirely understood. However, the addition of nickel phosphate to these known stabilizer combinations surprisingly increases their effectiveness as thermal and light stabilizers.

The process of this invention is applicable to polymers of alpha-monoolefins containing from about 2-6 carbon atoms per molecule. Mixtures of polymers of alpha-monoolefin, such as propylene polymers with other compatible alpha-monoolefin polymers and also copolymers of propylene with copolymerizable monomers such as ethylene and butene can also be stabilized in accordance with this invention. The process of this invention is also suitable for stabilizing such polymers as polyethylene, poly(butene-1), poly(pentene-1), copolymers of ethylene and 1-hexene, poly(3-methylbutene-1), and the like.

The stabilizer combination of this invention can be incorporated into the polymer in any conventional manner known for incorporating stabilizer additives. Stabilizers can be added to the powdered base polymer as solutions or slurries such as in acetone, stirred thoroughly by manual or mechanical means and the solvent evaporated and the mixture melt blended such as in a Brabender Plastograph. The stabilizer can be incorporated in the heat softened polymer by employing mixing equipment such as a roll mill or a Banbury mixer. Mixing is continued until the mixture is substantially uniform.

Nickel phosphate either as the ortho- or pyrophosphate such as disclosed in Handbook of Chemistry and Physics, 50th ed., The Chemical Rubber Co., Cleveland, Ohio, 1969, is suitable for use according to this invention. The nickel phosphate is employed in an amount to provide from about .05 to 5, preferably .2 to 2 parts by weight of nickel phosphate per 100 parts by weight of polymer (php.).

The 2-hydroxybenzophenone, and derivatives thereof, with which the nickel phosphate is employed to enhance its effectiveness as an ultraviolet stabilizer can be represented by the formula

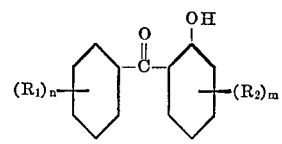

wherein $n$ is an integer from 0 to 5 and $m$ is an integer from 0 to 4 and the ($R_1$) and ($R_2$) radicals can be the same or different and are radicals selected from hydroxy (—OH), sulfo(—$SO_3H$), halogen (such as fluorine, chlorine, bromine, and iodide), or organic radicals selected from aliphatic, alicyclic, or heterocyclic groups containing from 1 to 30 carbon atoms. Some exemplary radicals are alkyl, alkenyl, alkynyl, cycloalkyl, acyl, aryl, alkaryl, aralkyl, alkoxy, aryloxy, alkaryloxy, aralkoxy, oxyalkylene, hydroxyalkyl, or hydroxyalkylene radicals, and esters thereof with organic carboxylic acids. The organic radicals can contain inert non-reactive substituents such as halogen and other carbocyclic and heterocyclic ring structures, and wherein up to a total of three of said radicals ($R_1$ and $R_2$) are hydroxy. Within the above limitations said R-radicals substituted on any ring or on different rings can be the same or different.

Typical organic radicals from which $R_1$ and $R_2$ can be selected are, for example, methyl, ethyl, propyl, isopropyl, butyl, isobutyl, t-butyl, amyl, isoamyl, n-octyl, isoctyl, 2-ethylhexyl, t-octyl, decyl, tert-nonyl, tert-heptyl, undecyl, dodecyl, pentadecyl, octadecyl, tricosyl, and nonacosyl; allyl, hexenyl, linoleyl, ricinoleyl, oleyl, undecadienyl, 12-octadecenyl, propynyl, methoxy, n-butoxy, n-octyloxy, 2-ethylhexyloxy, n-decyloxy, benzyloxy, acetoxy, benzyloxy; hexynyl, undecynyl; monochloroethyl, dichloroethyl, monobromopropyl, tribromopropyl, fluoroheptyl, chlorododecyl, chlorododecenyl, chlorododecynyl, chlorotricosyl; hydroxychlorononyl, hydroxybromodecyl, hydroxy bromotricosyl; hydroxyethyl, hydroxypropyl, monohydroxyundecyl, dihydroxyundecyl, hydroxyundecenyl, glyceryl, sorbityl, pentaerthrityl, and polyoxyalkylene radicals such as those derived from diethylene glycol, triethylene glycol, polyoxyethylene glycol, polyoxypropylene glycol, and polyoxypropyleneoxyethylene glycol, and esters thereof with any of the organic aliphatic, alicyclic, or oxygen-containing heterocyclic acids. By the term "aliphatic acid" is meant any open chain carboxylic acid substituted, if desired, with groups, such as halogen, sulfur and hydroxyl. By the term "alicyclic" it will be understood that there is intended any cyclic acid in which the ring is nonaromatic and composed solely of carbon atoms, and such acids may if desired have inert substituents such as halogen, hydroxyl, alkyl radicals, alkenyl radicals and other carbocyclic ring structures condensed therewith. Exemplary of such acids are acetic, propionic, butyric, valeric, hexanoic, ethyl-heptanoic, n-octanoic, isooctanoic, capric, undecanoic, lauric, myristic, palmitic, stearic, oleic, ricinoleic, behenic; chlorocaproic and hydroxycapric acids.

As typical examples of 2-hydroxy benzophenones or derivatives thereof that are intended to be included within the scope of this invention may be mentioned the following:

2-hydroxy-benzophenone,
2-hydroxy-4-bromobenzophenone,
2-hydroxy-4-methylbenzophenone,
2,4-dihydroxy-4'-tertiarybutylbenzophenone,
2,4,4'-trihydroxybenzophenone,
2-hydroxy-4-methoxy-4'-tertiary-butylbenzophenone,
2-hydroxy-4-decycloxybenzophenone,
2-hydroxy-4-heptyloxy-3',4'-dimethylbenzophenone,
2,2'-dihydroxy-4-(2-ethylhexyloxy)benzophenone,
2-hydroxy-4-benzyloxy-4'-tertiary-butylbenzophenone,
2-hydroxy-4,4'-dimyristoyloxybenzophenone,
2-hydroxy-4-(o-chlorobenzoyloxy)benzophenone,
2-hydroxy-4-iodo-benzophenone,
2-hydroxy-4-(pentachlorobenzyloxy)benzophenone,
2-hydroxy-4-benzyloxybenzophenone,
2-hydroxy-4,5-dimethylbenzophenone,
2-hydroxy-4-benzyloxy-5-chlorobenzophenone,
2-hydroxy-5-hexyl-2',4'-dimethylbenzophenone,
2-hydroxy-4-(3,4-dichlorobenzyloxy)-4'-t-butylbenzophenone,
2-hydroxy-3-methyl-4'-nitrobenzophenone,
2-hydroxy-4-hexylbenzophenone,
2-hydroxy-4-benzyloxy-2',4',5'-trichlorobenzophenone,
2-hydroxy-4-ethyl-3'-chlorobenzophenone,
2,4-dihydroxybenzophenone,
2,2',4-trihydroxybenzophenone,
4-n-decyloxy-2,2'-dihydroxybenzophenone,
2,2'-dihydroxy-4,4'-dimethoxybenzophenone,
2,2',4,4'-tetrahydroxybenzophenone,
2-hydroxy-4-methoxybenzophenone,
2,2'-dihydroxy-4-methoxybenzophenone,
2-hydroxy-4-n-octoxybenzophenone,
2-hydroxy-4-methoxy-2'-carboxybenzophenone,
2-hydroxy-4-methoxy-5-sulfobenzophenone,
4-dodecyloxy-2-hydroxybenzophenone,
2,2'-dihydroxy-4,4'-dimethoxy-5-sulfobenzophenone,
and the like, and mixtures thereof.

Said 2-hydroxy benzophenone and derivatives thereof are employed in an amount sufficient to provide from about .05 to 10, preferably .1 to 3 parts by weight per 100 parts by weight of monoolefin polymer to be stabilized.

Any conventional antioxidant can be employed with the nickel phosphate and 2-hydroxybenzophenone, or derivatives thereof, to complete the stabilizer combination according to my process. Examples of conventional antioxidants are disclosed in Modern Plastics, Encyclopedia, vol. 45, No. 14A, October 1968, pp. 505–507 (McGraw-Hill Publications, N.Y.). At least one of said conventional antioxidants and preferably two or more are employed according to this invention.

It is preferred that said at least one antioxidant is selected from phenols, organic phosphites, thiodipropionates, or triazines.

Said at least one antioxidant is employed in an amount to provide from about .005–5, preferably .1–2 parts by weight per 100 parts by weight of alpha-monoolefin polymer to be stabilized.

Phenolic antioxidants such as contain one or more phenolic hydroxyl groups, and can contain one or more phenolic nuclei, are exemplary phenol antioxidants that can be suitably employed. The phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups. Such phenols, which are preferred because of their superior stabilizing action can be defined by the formula:

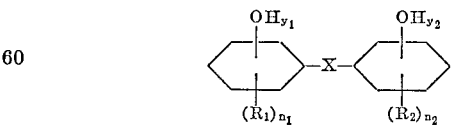

where X is an oxygen or sulfur atom, or an alkylene or alicyclidene or arylene or a mixed alkylene-alicyclidene or alkylene-arylidene group, having a straight or branched chain, whose total number of carbon atoms ranges from one to about eighteen, $y_1$ and $y_2$ are the number of phenolic hydroxyl groups OH, $n_1$ and $n_2$ are the number of R groups, and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

Typical X groups are —CH$_2$—, —CH$_2$CH$_2$—,

-◯-OH, -CH$_2$-◯-, -CH$_2$-◯-CH$_2$-◯-

—CH—, —S—, —O—, —CH$_2$—O—CH$_2$—
|
CH$_3$

-◯-S, ⬠-S, —CH$_2$(CH$_2$)$_3$—CH$_2$—

CH$_3$        CH$_3$
        |            |
—C—,  —CH$_2$—C—CH$_2$—,  —CH—,  —CH—,  —CH—
|            |            |      |      |
CH$_3$       CH$_3$       C$_3$H$_7$  C$_2$H$_5$  ◯

—CH$_2$—S—CH$_2$—, —CH$_2$-◯-S-◯-CH$_2$—, —CH$_2$-◯-S-◯

H
               |
               —C—
               |
               CH$_3$        C$_4$H$_9$
—CH$_2$-◯—, CH$_2$—CH-◯-OH
                           |
                           CH$_3$

CH$_3$
|
—C—
|
CH$_2$CH$_2$COOH

The various X and R groups are exemplified in the following compounds.

Exemplary of satisfactory monohydric phenols are 2,6-di-tertiary - butyl - 4 - methylphenol, 2-tertiary-butyl-4-methoxy phenol, nonyl phenol, dodecyl phenol, dinonyl phenol, phenyl phenol, tetradecyl phenol, and tetrahydro-α-naphthol octadecyl[3-(3,5-di-tert-butyl - 4 - hydroxyphenyl)]propionate, tetrakis[methylene(3,5-di-tert-butyl-4-hydroxyhydrocinnamate)]methane.

Exemplary polyhydric phenols are
orcinol,
propyl gallate,
catechol,
resorcinol,
4-octylresorcinol,
4-dodecylresorcinol,
4-octadecylcatechol,
4-isooctylphloroglucinol,
pyrogallol,
hexahydroxybenzene,
4-isohexylcatechol,
2,6-ditertiary butyl resorcinol,
2,6-diisopropyl-phloroglucinol,
methylenebis-(2,6-ditertiarybutyl-m-cresol),
methylenebis-(2,6-ditertiarybutylphenol),
2,2-bis(4-hydroxyphenol) propane,
methylenebis (p-cresol),
4,4'-thio-bis-phenol,
4,4'-oxobis-(3-methyl-6-isopropylphenol),
4,4'-thiobis(3-methyl-6-tertiary-butyl-phenol),
2,2'-oxobis(4-dodecyl-phenol),
2,2'-thiobis(4-methyl-6-tertiary-butyl-phenol),
2,6-diisooctyl resorcinol,
4,4'-n-butylidenebis(2-tertiarybutyl-5-methyl-phenol),
4,4'-benzylidenebis(2-tertiarybutyl-5-methyl-phenol),
2,2'-methylenebis-(4-methyl-6-(1'-methylcyclohexyl)-phenol),
4,4'-cyclohexylidene-bis(2-tertiarybutyl-phenol),
2,6-bis(2'-hydroxy-3'-tertiarybutyl-5'-methylbenzyl)-4-methyl-phenol,
4-octyl pyrogallol, and
3,5-ditertiarybutyl catechol.

Exemplary of suitable organic phosphite antioxidant stabilizers are the organic phosphites which can be any organic di- or tri-phosphite having attached to phosphorous through oxygen or sulfur, groups selected from aryl, alkyl, cycloalkyl, aralkyl and alkaryl groups, in any combinations, such as, two or three monovalent groups, (RA)$_3$P; one monovalent group and one bivalent group, forming a heterocyclic ring with the phosphorus.

$$R_1 \begin{array}{c} A \\ \diagdown \\ \diagup \\ A \end{array} P-AR$$

a plurality of bivalent groups forming polymers therewith, $$R_1 \begin{array}{c} A \\ \diagdown \\ \diagup \\ A \end{array} P-A-R_1-A-P \begin{array}{c} A \\ \diagdown \\ \diagup \\ A \end{array} R_1$$

one trivalent group, $$R_1-A-P \begin{array}{c} A \\ \diagdown \\ \diagup \\ A \end{array}$$

and a plurality of trivalent groups forming polymers therewith, $$HA-R_2 \begin{array}{c} A \\ \diagdown \\ \diagup \\ A \end{array} P-A-R_2 \begin{array}{c} A \\ \diagdown \\ \diagup \\ A \end{array} P-A-R_2 \begin{array}{c} AH \\ \\ AH \end{array}$$

and any combinations of monovalent, bivalent and trivalent groups to form monomeric and polymeric phosphites; A is oxygen or sulfur. The term "organo phosphite di or triester," as used herein, is inclusive of oxo, thio and mixed oxo thio phosphites, as well as transesterified phenolphosphite mixtures. Usually, the phosphite will not have more than about sixty carbon atoms.

Exemplary are monophenyl di-2-ethylhexyl phosphite, diphenyl mono-2-ethylhexyl phosphite, diisooctyl monotolyl phosphite, tri-2-ethyl hexyl phosphite, phenyl dicyclohexyl phosphite, diethyl phenyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-α-naphthyl phosphite, tri(phenylphenyl) phosphite, tri(2-phenyl ethyl) phosphite, tridodecyl thiophosphite, tri-p-tert-butyl phenyl thiophosphite, didecyl thiodiphenyl phosphite, tert-butyl phenyl thio-di-2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butyloxy - 1,3,2 - dioxaphosphorinane, 2 - octoxy-5,5-dimethyldioxaphosphorinane, 2 - cyclohexyloxy-5,5-diethyldioxaphosphorinane, tri(2,6 - di - tert-butyl-4-hydroxyphenyl) phosphite, dibutyl phosphite, didecyl phosphite, dioctyl phosphite, diphenyl decyl phosphite, or ditetradecyl phosphite, and the like.

Exemplary thiodipropionic acid esters suitable as antioxidant stabilizers according to my invention are those that can be represented by the following formula:

R$_1$OOCCH$_2$CH$_2$—S—CH$_2$CH$_2$COOY in which R$_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical R$_2$, which can be the same as or different from the R$_1$ radical, (c) a polymeric chain of $n$ thiodipropionic acid ester units:

XO[OCCH$_2$CH$_2$SCH$_2$CH$_2$COOXO]$_n$
OCCH$_2$CH$_2$—S—CH$_2$CH$_2$COOZ where Z is hydrogen, $R_2$ or M; $n$ is the number of thiodipropionic acid ester units in the chain; and X is a bivalent hydrocarbon group of the type of $R_1$; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX—O]_n$
    $OCCH_2CH_2SCH_2CH_2COOZ$
(d) $[R_1OOCCH_2CH_2SCH_2CH_2COO]_2M$

In the above formulae $R_1$ and $R_2$ M, X and Z are the same as reported for said general formula. In the polymer (c), as in the other forms of thiodipropionic acid esters, the total number of carbon atoms per sulfur atom is within the range from about ten to about sixty.

The said $R_1$ and $R_2$ radicals of these esters are important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert substituents such as halogen and other carbocyclic and heterocyclic ring structures condensed therewith.

Typical radicals from which $R_1$ and $R_2$ are selected are, for example, methyl, ethyl, proply, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexemethylene, decamethylene, alkyl- and aryl-substituted alkylene radicals such as 1,2-propylene.

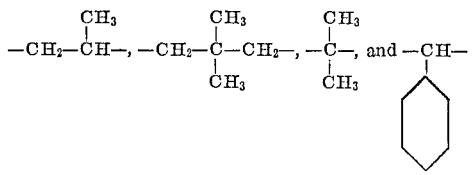

arylene radicals such as phenylene

methylenephenylene

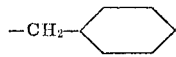

dimethylene phenylene,

and alicyclene radicals such as cyclohexylene

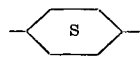

and cyclopentylene

As exemplary of the thiodipropionic acid esters which can be used there can be mentioned the following: monolauryl thiodipropionic acid, dilauryl thiodipropionate, butyl stearyl thiodipropionate, di(2 - ethylhexyl)-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonylthiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyesters of diethylene glycol and thiodipropionic acid, the polyester of triethylene glycol and thiodipropionic acid, the polyester of hexmethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

Exemplary triazines that can be employed as antioxidants are the 2-hydroxy aryl-1,3,5-triazines. These have the formula:

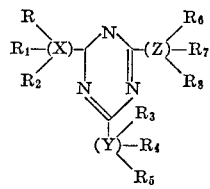

in which X, Y and Z are each an aromatic radical each containing up to three nuclei of six carbon atoms, for example, phenyl, naphthyl or biphenyl, X being substituted by a hydroxy group ortho with respect to the point of attachment to the triazine nucleus. The R's are hydrogen, hydroxyl (preferably in the 2-, 4- and/or 5-position of the aromatic nucleus) alkyl (for example, methyl, tertiary-butyl, cyclohexyl, tertiary-octyl, n-octyl and dodecyl), alkoxy (for example, methoxy, n-butoxy, 2-ethylhexyloxy or n-octyloxy), sulfonic or carboxylic acid groups, halogen (for example, iodine, chlorine or bromine), haloalkyl (for example, dichloromethyl or trifluoromethyl) alkylamido (for example, acetamido), mono cyclic arylamide (for example, benzamide and lower monocyclic aryl lower alkyl amides, such as phenylacetamido). Exemplary are 2,4,6-tris-(2-hydroxy-4-octyl-oxyphenyl)triazine-s;
2,4,6-tris-(2,4-dihydroxyphenyl)-triazine-s;
2,4,6-tris-(2-hydroxy-4-propoxyphenyl)-triazine-s;
2,4,6-tris-(2-hydroxy-5-methylphenyl)-triazine-s;

2,4-bis-(2,4-dihydroxyphenyl)-6-(-4-methoxyphenyl) triazine-s;
2-(-2,4-dimethylphenyl)-4-(-2,4-dihydroxyphenyl)-6-(o-hydroxyphenyl)-triazine-s;
2,4,6-tris-(2-hydroxynaphthyl-1)-triazine-s;
2,4,6-tris(o-hydroxyphenyl)-triazine-s;
2,4-(-2-hydroxy-5-carboxyphenyl)-6-(o-hydroxyphenyl)-triazine-s;
2,4,6-tris-(-2-hydroxy-5-chloro)-triazine-s;
2,4,6-tris-(-2,4-dihydroxy-6-hexylphenyl)-triazine-s;
2-(-2,4-dihydroxyphenyl)-4,6-diphenyl-triazine-s;
2-(o-hydroxyphenyl)-4,6-bis(4-methoxyphenyl)-triazine-s;
2,4,6-tris-(2,4-dimethoxyphenyl)-triazine-s;
2,4-bis-(2-hydroxy-4-methoxyphenyl)-6-(2,4-dimethoxyphenyl)-triazine-s;
2,4-bis-(-2,4-dihydroxyphenyl)-6-(-4-methoxyphenyl) triazine-s; and
2,4-bis-(4-hydroxy-3,5-di-tert-butylphenoxy)-6-(n-octylthio)-1,3,5-triazine.

The triazines having the following formula can also be employed:

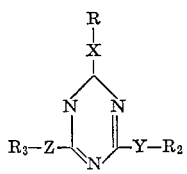

wherein at least one of $R_1$, $R_2$, or $R_3$ represent an alkyl group of from one to eighteen carbon atoms, for example, methyl, ethyl, propyl, butyl, pentyl, octyl, dodocyl and octadecyl, a cycloalkyl group of five to six carbon atoms, for example, cyclopentyl or cyclohexyl, a phenyl group or an alkyl phenyl group of from seven to twenty-four atoms, for example methylphenyl, ethylphenyl, butylphenyl, octylphenyl, octadecylphenyl, dimethylphenyl, dibutylphenyl and dioctadecylphenyl, an alkoxyalkyl group of from three to fifteen atoms, for example methoxymethyl, ethoxyethyl, butyoxyethyl, n-lauryl-oxyethyl, or an alkoxyphenyl group of from eight to nineteen carbon atoms, for example methoxyphenyl, ethoxyphenyl, n-octoxyphenyl or n-lauryloxyphenyl; wherein at least one of $R_1$, $R_2$, or $R_3$ designates an alkyl hydroxyphenyl of from seven to twenty-four carbon atoms, for example, methylhydroxyphenyl, ethylhydroxyphenyl, butylhydroxyphenyl, octylhydroxphenyl, octadecylhydroxyphenyl, di-t-butylhydroxyphenyl, methyl-di-t-butylhydroxyphenyl. X, Y and Z each designate a sulfur or oxygen atom or a substituted or unsubstituted imino group, preferably arylalkyl imino, for example, benzylimino.

An additional class of triazines has the formula:

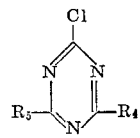

in which $R_4$ represents an alkylhydroxyanilino group, preferably one having seven to twenty-four carbon atoms, for example, methylhydroxyanilino, ethylhydroxyanilino, butylhydroxyanilino, octylhydroxyanilino, dodecylhydroxyanilino, octadecylhydroxyanilino, di-t-butyl-hydroxyanilino and methyl-di-t-butylhydroxy-anilino, or an alkyl thioalkoxy group, preferably having from one to eighteen carbon atoms, for example, thiomethyl, thioethyl, thiopropyl, thiobutyl, thiooctyl, thiododecyl, and thiooctadecyl, and $R_5$ represents an alkylhydroxyaniline group, preferably one corresponding to the definition of $R_1$ and $R_2$.

Exemplary compounds coming within one or both of the above triazine formulae are 6-(4-hydroxy-3,5-di-t-butylanilino)-2,4-bis-(n-thiooctyl)-1,3,5-triazine;
6-(4-hydroxy-3,5-di-t-butylanilino)-2,4-bis-thiophenyl-1,3,5-triazine;
6-(4-hydroxy-3,5-di-5-butylanilino)-2,4-bis-thiooctadecyl-1,3,5-triazine;
6-(4-hydroxy-3,5-di-t-butylanilino)-2,4-bis-thio-cyclohexyl-1,3,5-triazine;
6-(2-hydroxy-3,5-di-t-butyl-6-methylanilino)-2,4-bis-(n-thiooctyl)-1,3,5-triazine;
6-(4-hydroxy-3,5-di-t-butylanilino)-4-n-thiooctyl-2-chlor-1,3,5-triazine;
4,6-bis-(4-hydroxy-3,5-di-t-butyl-anilino)-2-chlor-1,3,5-triazine.

The stabilizer system of this invention is thus applicable to polymers made from alpha-monoolefin and prepared by any of the various conventional procedures using available catalysts such as disclosed in U.S. Patent 2,825,721, issued to Hogan et al., Mar. 4, 1956.

Summarily, the preferred stabilizer system of this invention comprises (a) 2-hydroxybenzophenone, or derivatives thereof, (b) nickel phosphate and (c) at least one antioxidant.

Illustrative of the following discussion and not to be interpreted as a limitation on the scope thereof, or on the materials herein employed, the following examples are presented.

EXAMPLE I

Testing samples of powdered polypropylene having a nominal melt flow of 3 were prepared. A mixture of the additives in acetone were admixed with the base polymer and the solvent evaporated. The mixture was then blended in a Brabender Plastograph for 10 minutes in a nitrogen atmosphere at 185° C. The prepared samples had the following composition by weight.

| Sample Number | I | II | III |
|---|---|---|---|
| Polypropylene, parts | 100 | 100 | 100 |
| DLTDP [1] (php.) [2] | .1 | .1 | .1 |
| Irganox 858 [3] (php.) | .1 | .1 | .1 |
| DOPI [4] (php.) | .01 | .01 | .01 |
| Cyasorb UV-531 [5] (php.) | .07 | 1.57 | .07 |
| Ferro AM-101 [6] (php.) | 1.5 | | |
| Nickel Phosphate (php.) | | | 1.5 |

[1] Antioxidant, dilauryl-3,3'-thiodipropionate, Evans Chemetics, Inc.
[2] Parts by weight of additive per 100 parts by weight of polymer.
[3] Antioxidant, 2,4-bis-(4-hydroxy-3,5-di-tert-butylphenoxy)-6-(n-octylthio)-1,3,5-triazine, Geigy Chemical Company.
[4] Antioxidant, dioctyl phosphite, Hooker Chemical Corp.
[5] Ultraviolet absorber, 2-hydroxy-4-n-octoxybenzophenone, American Cyanamide Co.
[6] Ultraviolet absorber, bis[2,2'-thiobis[4-(1,1,3,3-tetramethylbutyl)]]-nickel (II), Ferro Corp.

Compression-molded film 10 mils in thickness were made from each of the three samples shown above. Specimens 1½″ long and ⅜″ wide were tested for long-term thermal stability (oven life) by placing said specimens in glass test tubes with a 0.125-inch diameter hole in the bottom thereof. The tubes containing the test specimens were placed in a forced-air oven at 150° C. Failure of the sample is indicated by deterioration of one exposed edge. The above samples were also tested for melt flow stability at an elevated temperature using the general procedure of ASTM-1238-65T at 290° C. and employing a 2160 gram weight. The lower the melt flow the less the polymer sample has been thermally degraded. The results of these tests are reported in Table I.

TABLE I

| Sample No. | Oven life, days | Melt flow |
|---|---|---|
| I (control) | 13 | 90 |
| II (control) | 20 | 56 |
| III (invention) | 28 | 23 |

The above results demonstrate that the thermal stability of polypropylene is enhanced by employing nickel phosphate in combination with a 2-hydroxy-benzophenone derivative. Comparison of Sample Runs II (control) and III (invention) demonstrate that the addition of nickel phosphate for an equal amount of said 2-hydroxy-benzophenone derivative vastly improves the stability of a polypropylene polymer. Comparison of Sample Runs I (control) and III (invention) demonstrate the stabilizing superiority of nickel phosphate in combination with 2-hydroxybenzophenone derivatives over an organic nickel compound.

EXAMPLE II

Testing samples of polypropylene were compounded as in Example I according to the following recipe, parts by weight additive per 100 parts by weight of polymer:

| Sample Number | IV | V | VI |
|---|---|---|---|
| Polypropylene [1] | 100 | 100 | 100 |
| BHT [2] | .1 | .1 | .1 |
| DLTDP [3] | .2 | .2 | .2 |
| Irganox 1010 [4] | .1 | .1 | .1 |
| Cyasorb UV-531 [3] | .1 | .1 | .1 |
| Ferro AM-101 [3] | | .1 | |
| Nickel phosphate | | | .1 |

[1] Melt flow of 4-5.
[2] Antioxidant, 2,6-di-tert-butyl-4-methylphenol, Catalin Corp.
[3] As reported in footnotes, Table I.
[4] Antioxidant, tetrakis[methylene(3,5-di-tert-butyl-4-hydroxy-hydrocinnamate)]methane.

Five compression-molded sheets 20 mils in thickness were prepared from each of the above compositions. Specimens 3″ long and ⅜″ wide were cut from the sheets. The specimens were secured to a mounting jig by screws through one end of the sheet allowing 2½″ of the specimen to hang downward untouched. The specimens were positioned 3″ from an American Cyanamid fluorescent black lamp/sunlamp.

Each specimen was manually flexed to about 90° daily. Failure is indicated by the average time the five sheets of each polymer sample broke.

The results are reported in Table II.

TABLE II

| Sample No.: | Hours to failure |
|---|---|
| IV (control) | 136 |
| V (control) | 407 |
| VI (invention) | 430 |

The above results further demonstrate that the effectiveness of 2-hydroxybenzophenone UV-stabilizers is greatly enhanced by the employment of nickel phosphate according to this invention.

As will be evident to those skilled in the art, various modifications of this invention can be made or followed in light of the discussion and disclosure herein set forth without departing from the scope or the spirit thereof.

I claim:

1. An improved thermal and ultraviolet light stable polymer composition comprising (a) polymers prepared from alpha-monoolefins containing from about 2-6 carbon atoms per molecule, (b) 2-hydroxybenzophenone or derivatives thereof represented by the following formula:

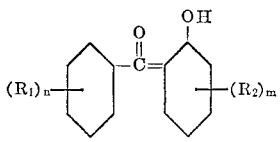

wherein $n$ is an integer from 0 to 5 and $m$ is an integer from 0 to 4 and ($R_1$) and ($R_2$) radicals can be the same or different and are radicals selected from hydroxy, sulfo, halogen, and organic radicals selected from aliphatic, alicyclic, and heterocyclic groups containing from about 1 to 30 carbon atoms, and wherein said 2-hydroxybenzophenone, or derivatives thereof are employed in an amount sufficient to provide from about .05 to 10 parts by weight per 100 parts by weight of said polymer of an alpha-monoolefin, (c) at least one antioxidant, and (d) a nickel phosphate in amounts sufficient to provide from about 0.05 to 5.0 parts by weight of nickel phosphate per 100 parts by weight of said polymer.

2. A composition in accord with claim 1 wherein said 2-hydroxybenzophenone, or derivatives thereof, is employed in an amount sufficient to provide from about 0.1 to 3 parts by weight per 100 parts by weight of said polymer, wherein said at least one antioxidant is selected from phenols, organic phosphites, thiodipropionates, and triazines, and wherein said at least one antioxidant is employed in an amount sufficient to provide from about 0.005 to 5 parts by weight per 100 parts by weight of said polymer.

3. A composition in accord with claim 2 wherein said at least one antioxidant is employed in an amount sufficient to provide from about 0.1 to 2 parts by weight per 100 parts by weight of said polymer.

4. A composition in accord with claim 3 wherein said antioxidant is selected from 2,6-di-tert-butyl-4-methylphenol; dilauryl-3,3′-thiodipropionate; 2,4-bis(4-hydroxy-3,5-di-tert-butylphenoxy)-6-(n - octylthio)-1,3,5-triazine; tetrakis[methylene(3,5-di-tert-butyl - 4 - hydroxy-hydrocinnamate)]methane; and dioctylphosphite; and said alpha-monoolefin comprises propylene.

5. A composition in accord with claim 4 wherein the 2-hydroxybenzophenone derivative is 2-hydroxy-4-n-octoxybenzophenone; and said polymer is essentially polypropylene.

6. A composition in accord with claim 5 wherein said antioxidant is 2,6-di-tert-butyl-4-methylphenol; dilauryl-3,3′-thiodipropionate; 2,4-bis(4 - hydroxy - 3,5 - di-tert-butylphenoxy)-6-(n-octylthio) - 1,3,5 - triazine; tetrakis[methylene(3,5 - di - tert - butyl - 4 - hydroxy-hydrocinnamate)]methane; and dioctylphosphite.

7. A stabilizer combination for improving the thermal and ultraviolet stability of polymers prepared from alpha-monoolefins having from about 2-6 carbon atoms per molecule, said combination consisting essentially of (a) nickel phosphate, (b) 2-hydroxybenzophenone or derivative thereof represented by the following formula:

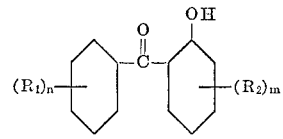

wherein $n$ is an integer of from 0 to 5 and $m$ is an integer from 0 to 4 and ($R_1$) and ($R_2$) radicals can be the same or different and are radicals selected from hydroxy, sulfo, halogen or organic radicals selected from aliphatic, alicyclic and heterocyclic groups containing from about 1 to 30 carbon atoms, (c) at least one antioxidant selected from phenols, organic phosphites, thiodipropionates, and triazines.

8. The combination of claim 7 wherein said at least one antioxidant is selected from 2,6-di-tert-butyl-4-methylphenol; dilauryl - 3,3′ - thiodipropionate; 2,4-bis(4-hydroxy-3,5-di-tert-butylphenoxy)-6-(n-octylthio) - 1,3,5-triazine; tetrakis[methylene(3,5-di-tert-butyl - 4 - hydroxy-hydrocinnamate)]methane; and dioctylphosphite.

9. The combination of claim 7 wherein at least one antioxidant comprises 2,6-di-tert-butyl-4-methylphenol; tetrakis[methylene(3,5-di-tert-butyl - 4 - hydroxy-hydrocinnamate)]methane; and dilauryl-3,3′-thiodipropionate and wherein said derivative of 2-hydroxybenzophenone is 2-hydroxy-4-n-octoxybenzophenone.

(References on following page)

References Cited

UNITED STATES PATENTS

| | | | |
|---|---|---|---|
| 3,006,959 | 10/1961 | Armitage | 260—45.95 |
| 3,163,492 | 12/1964 | Thomas | 260—45.75 |
| 3,190,852 | 6/1965 | Doyle | 260—45.85 |
| 3,218,294 | 11/1965 | Rodgers | 260—45.75 |
| 3,255,191 | 6/1966 | Dexter | 260—45.8 |
| 3,280,070 | 10/1966 | Battista | 260—45.85 |
| 3,285,555 | 11/1966 | Dexter | 260—45.85 |
| 3,367,870 | 2/1968 | Spivack | 260—953 |
| 3,403,967 | 10/1968 | Stanley | 260—45.95 |
| 3,454,525 | 7/1969 | Tholstrup | 260—45.85 |
| 3,464,943 | 9/1969 | Newland | 200—45.75 |

DONALD E. CZAJA, Primary Examiner

V. P. HOKE, Assistant Examiner

U.S. Cl. X.R.

252—400, 401, 404, 406, 407; 260—45.7 R, 45.7 P, 45.7 PS, 45.8 A, 45.8 N, 45.85, 45.95